J. PHALP.
STOP ACTION FOR PERAMBULATORS AND SIMILAR VEHICLES.
APPLICATION FILED JUNE 21, 1910.
995,480.
Patented June 20, 1911.
2 SHEETS—SHEET 1.
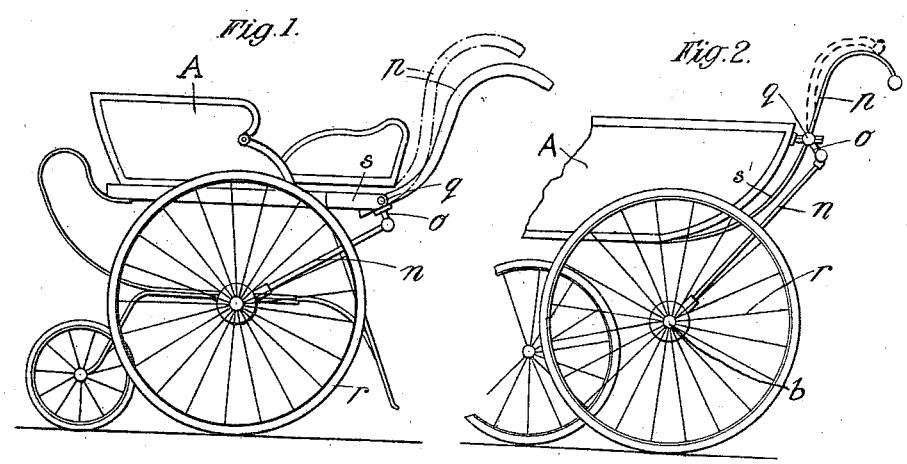
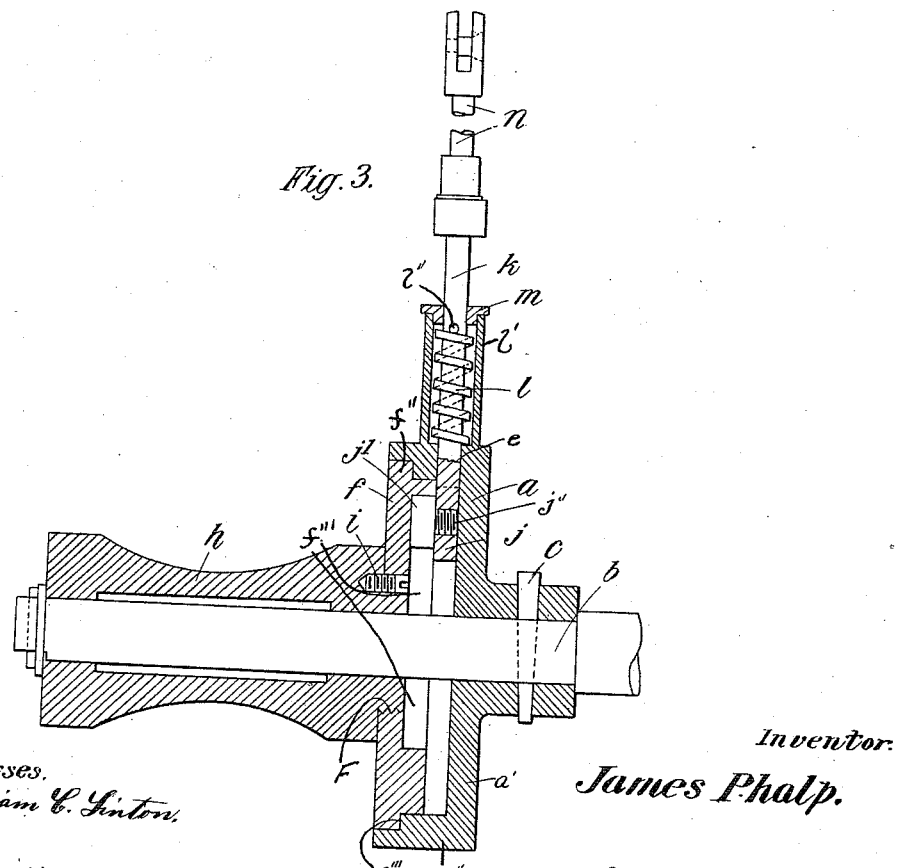
Witnesses.
William E. Linton.
J. Chilton
Inventor:
James Phalp.
By Joshua R.H. Potts
Attorney J. PHALP.
STOP ACTION FOR PERAMBULATORS AND SIMILAR VEHICLES.
APPLICATION FILED JUNE 21, 1910.
Patented June 20, 1911.
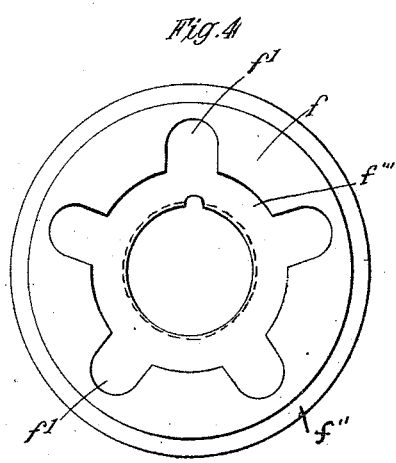
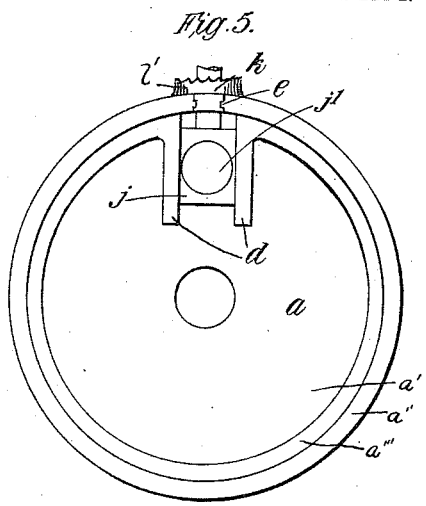
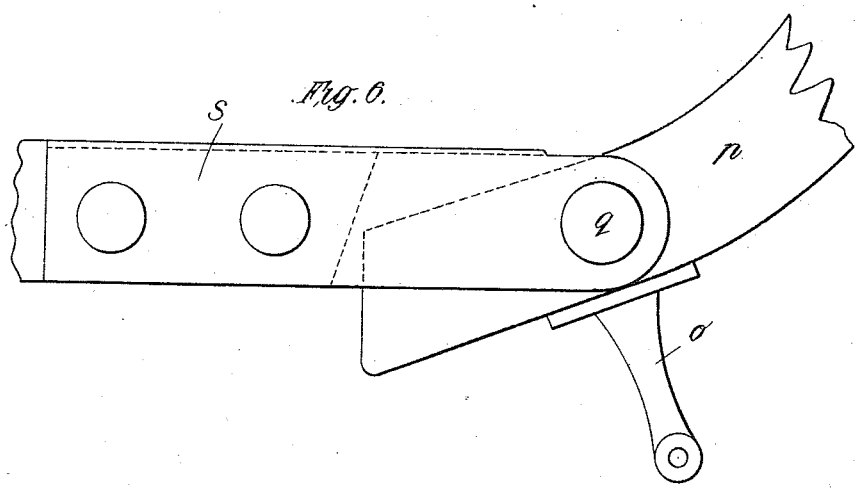
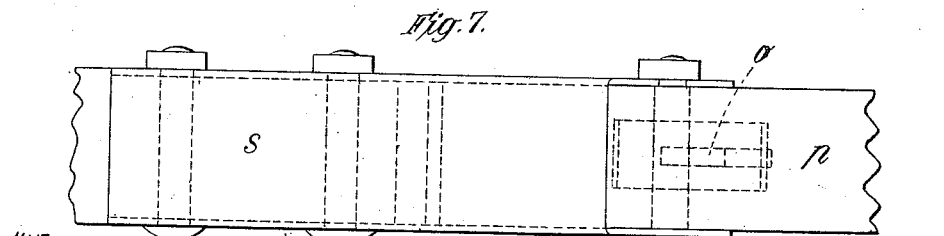
Inventor:
James Phalp.

UNITED STATES PATENT OFFICE.

JAMES PHALP, OF SEAHAM HARBOUR, ENGLAND.

STOP-ACTION FOR PERAMBULATORS AND SIMILAR VEHICLES.

995,480.  Specification of Letters Patent.  Patented June 20, 1911.

Application filed June 21, 1910. Serial No. 568,081.

*To all whom it may concern:*

Be it known that I, JAMES PHALP, a subject of His Majesty the King of England, residing at 11 Blandford Place, Seaham Harbour, in the county of Durham, Kingdom of England, merchant, have invented a certain new and useful Stop-Action for Perambulators and Similar Vehicles, of which the following is a specification.

My invention relates to stop actions or automatic brakes for perambulators, mail carts and other similar vehicles provided with a handle for manipulating the same.

The object of my invention is to provide an automatic brake for vehicles of the class mentioned whereby when the hands are removed from the handle bar the brake will be automatically applied.

A further object of my invention is to provide a device of the class mentioned which may be readily applied to substantially any vehicle of the character above mentioned.

Further objects of my invention are to provide a device of the class mentioned which shall be of simple construction, easy to assemble and which will in a large measure exclude dust and dirt from the brake portion proper.

Other objects will appear hereinafter.

With these objects in view my invention consists generally in a two part casing mounted upon an axle of the vehicle, one part of the casing being secured to a wheel and the other part to the axle, an annular channel in one part of the casing from which extends radial recesses or notches, a rod extending into said casing and provided with a member adapted to be positioned in either said channel or one of the recesses, a pivotally mounted handle bar, a suitable connection between the handle bar and said rod and a spring for actuating said rod when the handle bar is released to move the member on the bar into one of said recesses to apply the brake.

My invention further consists in various details of construction and arrangements of parts all as will be fully described hereinafter and particularly pointed out in the claims.

My invention will be more readily understood by reference to the accompanying drawings forming a part of this specification and in which—

Figure 1 is an elevation of a mail cart equipped with a device embodying my invention, Fig. 2 is a similar view of a perambulator, Fig. 3 is a section through one of the hubs of the vehicle and the brake portion of the device, Fig. 4 is a detail elevation of one portion of the casing, Fig. 5 is a similar view of the other portion of the casing, Fig. 6 is a detail side elevation of the pivotal connection between the handle bar and the frame of the vehicle, and Fig. 7 is a plan view of the portion of the device illustrated in Fig. 6.

Referring now to the drawings, A indicates the vehicle, $b$ an axle thereof and $r$ one of the wheels rotatably mounted on the axle $b$. The device need only be applied to one wheel and in Fig. 3 $h$ indicates the hub of the wheel to which it is applied. Arranged at the inner end of the hub is a casing comprising the two parts or members $a$ and $f$, the former being secured to the axle by a pin $c$ and the latter fixed to the hub $h$ by threading the same thereon as at F. A small screw $i$ prevents rotation of the portion $f$ on the hub.

The casing member $a$ comprises a circular plate $a'$ and an annular peripheral flange $a''$, the latter being provided with an annular shoulder $a'''$. The member $f$ comprises a disk fitting snugly within the flange $a''$ and provided with a peripheral flange $f''$ fitting against the shoulder $a'''$. The parts $a$ and $f$ are therefore so assembled as to practically exclude dust and dirt from the interior of the casing. The member $a$ will hereinafter be designated as a stationary member of the casing and the member $f$ as the rotary member thereof.

Formed integral with the stationary member $a$ of the casing and extending radially therefrom is a hollow cylindrical portion $l'$ which is provided at its outer end with a cap $m$. Extending through the cap $m$, and portion $l'$ into the casing $a$—$f$ is a rod $k$, the flange $a'$ being drilled or apertured as at $e$ to receive the same. On the inner end of the rod $k$ is a block $j$ which is slidably mounted to move in a substantially radial path between parallel disposed ribs $d$ formed on the inner face of the plate $a$. Projecting from the block $j$ is a stud $j'$, preferably cylindrical and provided with a threaded stem $j''$ by means of which it is secured to the block.

$l$ indicates a spring interposed between the bottom of the portion $l'$ and a pin $l''$ extending through the rod $k$.

The inner face of the rotary casing member $f$ is provided with an annular channel $f''''$ which is of somewhat greater width than the diameter of the stud $j'$, and extending radially from the channel $f''''$ are a plurality of notches or recesses $f'$. It is obvious that when the block $j$ is depressed against the tension of the spring $l$ to bring the stud $j'$ into the channel $f''''$, the wheel will be free to rotate, and that when the rod $k$ is released the spring $l$ will force the stud outwardly into one of the recesses $f'$, thereby preventing rotation of the wheel.

$s$ indicates the frame of the vehicle to which is pivotally mounted as at $q$ a handle $p$. Fixed to the handle $p$ is a bracket $o$ which is connected to the rod $k$ by an extension rod $n$. The bracket $o$ is arranged beneath the handle so that when the handle is released by removing the hands therefrom, the spring $l$ will raise the same as shown in dotted lines in Figs. 1 and 2.

Having described my invention what I claim as new and desire to secure by Letters Patent is:

1. A vehicle in combination with a handle pivotally mounted thereon, an axle, a wheel rotatably mounted on said axle, a two part casing comprising a stationary part fixed to said axle and a rotary part fixed to said wheel, the rotary part being provided on its inner face with an annular channel and a radial notch extending outwardly from said channel, a member slidably mounted within said casing, a stud on said member extending into said channel, a rod connecting said slidably mounted member and said handle and a spring normally tending to raise said handle and move said stud into said radial notch, substantially as described.

2. A vehicle in combination with a handle pivotally mounted thereon, an axle, a wheel rotatably mounted on said axle, a two part casing, one part being fixed to the axle and the other part being fixed to the wheel, the first part being provided with an annular cylindrical flange and the parts secured to the wheel being circular and rabbeted at the edge into said flange, the last said part being provided with an annular channel and a radial notch extending from said channel, a member slidably mounted in said casing, a stud on said member for engaging said channel, a rod connecting said member and said handle and a spring normally tending to force said stud outwardly and to raise said handle, substantially as described.

3. In a device of the class described, a casing comprising a stationary member adapted to be secured to the axle of a vehicle and a rotary member adapted to be secured to the wheel of the vehicle, the rotary member being provided with an annular channel and a radial notch extending from said channel, a cylindrical spring casing extending radially from the periphery of the stationary member, a member slidably mounted within said casing, a rod extending from said member through said casing, a stop on said rod, a spring interposed between the bottom of said spring casing and said stop and a stud extending from said member into said channel, substantially as described.

4. In a device of the class described, a casing comprising a stationary member adapted to be secured to the axle of a vehicle and a rotary member adapted to be secured to the hub of the wheel, said rotary member being provided with an annular channel and a notch extending radially therefrom, a member slidably mounted within said casing, guides in said casing for said member and a stud extending from said member into said channel, substantially as described.

In testimony whereof I have hereunto set my hand in presence of two subscribing witnesses this 2nd day of June 1910.

JAMES PHALP.

Witnesses:
H. NIXON,
F. H. DUKE.

---

Copies of this patent may be obtained for five cents each, by addressing the "Commissioner of Patents, Washington, D. C."